United States Patent [19]
Leroy et al.

[11] Patent Number: 4,770,840
[45] Date of Patent: Sep. 13, 1988

[54] SPECTRAL SHIFT LIGHT WATER NUCLEAR REACTOR

[75] Inventors: Claude Leroy, Lardy; Jean-Paul Millot, Elancourt; Eric Gonse, Sceaux, all of France

[73] Assignee: Framatome, Courbevoie, France

[21] Appl. No.: 50,442

[22] Filed: May 18, 1987

Related U.S. Application Data

[63] Continuation of Ser. No. 739,253, May 30, 1985, abandoned.

[51] Int. Cl.[4] .................. G21C 7/08; G21C 7/26
[52] U.S. Cl. .................... 376/209; 376/267; 376/346; 376/399; 376/444
[58] Field of Search ............ 376/267, 209, 435, 444, 376/443, 447, 346, 399

[56] References Cited

U.S. PATENT DOCUMENTS

| | | | |
|---|---|---|---|
| 3,508,885 | 9/1970 | Kumpf | 376/444 |
| 3,802,995 | 4/1974 | Fritz et al. | 376/435 |
| 3,861,999 | 1/1975 | Zmola et al. | 376/444 |
| 4,255,236 | 3/1981 | Robbins | 376/209 |
| 4,302,289 | 11/1981 | Lingren et al. | 376/267 |
| 4,371,495 | 2/1983 | Marlatt | 376/209 |
| 4,432,934 | 2/1984 | Gjertsen et al. | 376/333 |
| 4,544,521 | 10/1985 | Millot et al. | 376/209 |

FOREIGN PATENT DOCUMENTS

| | | | |
|---|---|---|---|
| 0072327 | 2/1983 | European Pat. Off. | 376/435 |
| 3247544 | 7/1983 | Fed. Rep. of Germany | 376/209 |
| 1468898 | 1/1967 | France | 376/443 |
| 2,535,509 | 5/1984 | France . | |
| 0141892 | 12/1978 | Japan | 376/444 |

*Primary Examiner*—Harvey E. Behrend
*Attorney, Agent, or Firm*—Pollock, Vande Sande & Priddy

[57] ABSTRACT

For operating a PWR with spectral shift during all combustion cycles and with undermoderation during some cycles only, the reactor structure is designed for receiving either one of two types of fuel assemblies, having the same geometry. All fuel assemblies have guide tubes for receiving spectral shift clusters containing fissile material but with different elements bundles so as to be able to choose the type of operation.

5 Claims, 4 Drawing Sheets

SPECTRAL SHIFT LIGHT WATER NUCLEAR REACTOR

This is a continuation of application Ser. No. 739,253, filed May 30, 1985, now abandoned.

FIELD OF THE INVENTION

The invention relates to light water nuclear reactors and, more particularly, to a method for operating such a reactor for operation with different neutron energy spectra.

BACKGROUND OF THE INVENTION

The light water nuclear reactors typically comprise a pressure containment vessel containing a core constituted of vertical fuel assemblies located in side-by-side relation, each having fuel elements distributed at the nodes of a regular network, each fuel element containing fissile material and possibly fertile material. The fuel elements are substituted at some of the nodes of the network with guide tubes slidably receiving movable rods of control clusters. The fuel assemblies are at least partially substituted with other fuel assemblies after each burn-up cycle of the reactor.

In each fuel assembly, the fuel elements are separated by a gap which flows cooling and moderating water. A moderation ratio VM/VU is defined as a ratio of a moderator module VM to the fissile material volume VU in the core.

Conventional light water reactors now in operation have a moderation ratio such that the energy spectrum of the neutrons is thermal. Two directions have been explored for improving the light water reactors and for a better use of the fuel material. Both directions imply that the moderation ratio is at least temporarily decreased.

The first approach consists of varying the neutron energy spectrum as the fuel burns up during a cycle. The natural uranium consumption and the initial degree of enrichment may be decreased for a predetermined burn-up rate. A spectral shift reactor which appears of particular interest is described in French Patent Application No. 82 18011 (FR-A-2,535,509). That reactor is comparable in structure to the conventional PWRs but includes a mechanical device for shifting the neutron spectrum, comprising clusters of rods containing fertile material, such as natural or depleted uranium oxide. The clusters are movable for insertion into the core or removal from the core during operation of the reactor. When fertile rods are introduced in guide tubes of the assemblies, they force moderating water out of the guide tubes and decrease the moderator volume VM in the core. As a consequence, during an operating cycle of the core, the neutron energy spectrum may be shifted. During a first part of the cycle, the clusters of fertile rods are maintained in the core. They shift the energy spectrum toward higher energies and increase the conversion rate of fertile material (uranium 238) into fissile material (plutonium). During a second part of the cycle, the clusters dedicated to spectral shift are progressively removed. The fissile material formed during the first part of the cycle is then partially burnt. The conversion rate is increased by about 10% with respect to a conventional thermal neutron PWR due to conversion rate increase.

The other approach consists of under-moderating the reactor at all times. Then it is possible to use a mixed fuel comprising natural uranium and plutonium with a "breeding" rate of plutonium of about 1. However, the necessary decrease of the moderation rate VM/VU typically requires that the fuel elements be located in the fuel assemblies in a triangular rather than square array.

Most under-moderated reactors comprise two types of fuel assemblies. Some, called fissile assemblies, contain principally fissile material; the others, called fertile assemblies, contain a material capable of being converted to fissile material under the effect of neutron bombardment. The fertile assemblies are generally disposed at the periphery of the core where they collect neutrons produced by the fissile assemblies.

Proposals have been made for combining the advantages of spectral shift (particularly the gain on uranium consumption) and of under-moderation (plutonium breeding rate possibly greater than 1, possible use of depleted uranium, increased cycle duration). French Patent Application No. 83 15591 discloses a reactor having a heterogeneous core in which fuel assemblies of a type suitable for use in under-moderated reactors and fuel asssemblies for spectral shift reactors are associated for best utilization of plutonium previously produced in the fuel assemblies of conventional thermal neutron PWRs. That plutonium is recovered during reprocessing of spent fuel assemblies.

However, that approach requires that a utility which has a plurality of nuclear power plants should dedicate at least one power plant to use of recovered plutonium.

A first consideration suggests that the difficulty cannot be overcome since that type of fuel assembly which is required for under-moderated reactors does not lend to use in association with the internals and the control system of a reactor for operation with thermal neutrons, and conversely.

SUMMARY OF THE INVENTION

It is an object of the invention to provide an improved method of operation of a spectral shift reactor. It is a more specific object to overcome the drawback consisting of the need for operation of a plurality of different types of reactors each of specific design. It is still an other object to provide a flexible process of operation of a PWR having a core consisting of fuel elements all having the same geometry.

For that purpose, there is provided a method of operating a light water nuclear reactor wherein the internals of the reactor are so designed that it may receive either fuel assemblies of a first type for under-moderated operation with a high breeding rate or fuel assemblies of a second type having guide tubes authorizing spectral shift from the thermal range to the intermediary range. Part at least of the assemblies of one type are substituted with the assemblies of the other type after an operating cycle of the core.

If the assemblies for under-moderated operation are so designed that they also authorize spectral shift and if the guide tubes for fertile rods are located at the same places in all fuel assemblies, it will be possible, without any modification of the higher internals of the reactor and of the cluster control mechanisms, to operate the reactor within a very broad moderation range, from thermal neutron reactors up to plutonium producing under-moderated reactors, during operating cycles.

For achieving the required compatibility of the different fuel assemblies, all fuel assemblies will include fuel elements distributed according to the same, typically triangular, array. The reactor will typically be operated during the first cycle with regular spectral shift, the fuel assemblies including U235 enriched uranium as fissile material. During the second, under-moderated, operating cycle, the fissile material will be natural or depleted uranium with plutonium, as oxides $UO_2$-$PUO_2$.

As an example only, the moderation ratio ranges may be as follows:

|  |  | SSR | UMR |
|---|---|---|---|
| VM/VU | Lifted fertile clusters | 2 | 1,4 |
|  | Inserted fertile clusters | 1,5 | 1,1 |

The abbreviations SS and UM respectively correspond to operation with spectral shift and under-moderation. The present day PWRs generally operate with a moderation rate of about 1.9.

For carrying out the invention, it will typically be necessary to provide the pressure vessel with a control rod operating mechanism for each fuel assembly location. About two thirds of the mechanisms will be for spectral shift (fertile clusters) while one third will be for the usual fine control regulation and safety purposes (absorbing clusters). The actuating mechanisms may be conventional. The absorbing clusters will typically be associated with ratchet type electromechanical mechanisms, while the fertile clusters will be associated with hydraulic mechanisms.

According to an other aspect of the invention, there is provided a reactor comprising, in a pressure containment vessel, a core consisting of adjacent vertical fuel assemblies each comprising fuel elements and guide tubes distributed at the nodes of a triangular array. The vessel is provided with mechanisms for vertical movement of control clusters. Upper internals in the vessel are used for guiding the clusters. Some of the clusters consist of fertile rods for shifting the neutron spectrum during a cycle. The other control clusters include absorbing material. The reactor has an actuating mechanism above each fuel assembly location and the fuel element array in each assembly is such that the core is under-moderated when all nodes are occupied by a rod or fuel element. Some at least of the assemblies comprise water filled tubes at some of the nodes of the network. The number and the distribution of such tubes are such that they authorize thermal operation of the reactor.

The invention will be better understood from the following description of a particular embodiment, given by way of example only. The description refers to the accompanying drawings.

SHORT DESCRIPTION OF THE DRAWINGS

FIG. 1b is a horizontal cross-section of a fuel assembly of the core of FIG. 1a;

FIG. 2b is a horizontal cross-section of a fuel assembly of the core illustrated in FIG. 2a;

FIG. 3 is a schematic vertical cross-section of part of a reactor for receiving a core according to FIG. 1a or FIG. 2a;

DETAILED DESCRIPTION OF AN EMBODIMENT

Figure 1A:
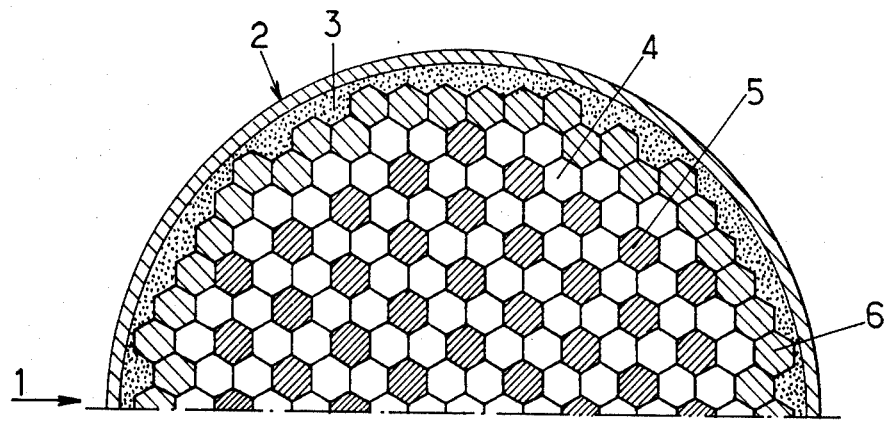
FIG. 1a is a schematic horizontal cross-section illustrating part of the core of a nuclear reactor designed for under-moderated operation with spectral shift and a high plutonium breeding rate.
Figure 1B:
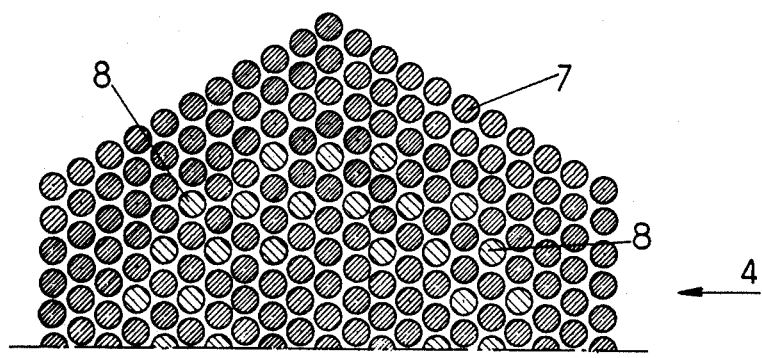

Referring to FIGS. 1a and 1b, a core 1 comprises fuel assemblies within an envelope 2 received in the pressure containment vessel of the reactor (not shown). The fuel assemblies have a prismatic shape with a hexagonal cross-section. They are standing vertically and in mutually adjacent position. A heavy neutron reflector 3 is located between the fuel assemblies and the core envelope 2. That reflector may consist of stainless steel blocks so shaped as to provide a transition between the generally hexagonal shape of the core and the circular shape of the envelope 2. The reflector also constitutes a baffle around the fuel assemblies and may be secured to the core envelope 2.

The core of FIGS. 1a and 1b is for under-moderated operation. It comprises fuel assemblies which may be distributed into three groups, depending on their own structure or the structure of the clusters cooperating with them.

Fuel assemblies 4 are fissile assemblies. Their fuel elements contain U235 or Pu enriched uranium oxide. They are so located that their guide tubes receive clusters of depleted uranium oxide. When the rods are actually in the core, they decrease the volume of moderator in the core and cause the reactor to operate as described in French Patent Application No. 84 02329.

Assemblies 5 are also fissile assemblies whose guide tubes receive absorbing rod clusters which conventionally allow the power of the reactor to be adjusted; such rods include material having a high neutron capture cross-section.

Assemblies 6 are fertile assemblies formed by elements containing natural uranium and allow production of fissile material.

Referring to FIG. 1b, a fissile assembly 4 comprises a set of fissile elements 7 containing a column of pellets formed by a mixture of uranium oxide and plutonium oxide whose fissile material mainly consists of uranium 235 and plutonium 239.

The fissile elements 7 are disposed in a regular triangular lattice. Each of assemblies 4 with hexagonal section is surrounded, in the central part of the core, by six other fissile assemblies 4 or 5. At the periphery, the fissile assemblies are adjacent to three fissile assemblies 4 or 5 and three fertile assemblies 6. The set of fuel elements of the assemblies forms a regular network with triangular lattice in the core cross-sections. Each fuel element 1 comprises in each of its end portions a column of natural uranium oxide pellets forming an axial blanket which, in the same way as the heavy reflector 3, limits the leak of neutrons towards the equipments of the reactor.

In the network of fuel elements 7 forming assembly 4, forty nodes of the lattice are occupied by guide tubes 8 of the same diameter as the fuel elements 7.

As described in French Patent Application 84 02329 the guide tubes 8 increase the spacing between elements 7 and thus increase the moderation ratio when they are filled with water. Their presence ensures compatibility with the requirements of mechanical resistance of the fuel assembly and thermohydraulic behavior.

To counteract the increase of the moderation ratio and allow under-moderated operation, the guide tubes 8 are arranged to receive clusters of fertile elements 5 which, when they are inserted, reduce the volume of moderator in the core thus equipped, thus allowing a high conversion rate of the uranium 238 contained in the fertile clusters and in the fissile elements into plutonium 239.

The guide tubes 8 of the fuel assemblies 5 are arranged to receive clusters of absorbing elements for controlling the nuclear reactor.

Figure 2A:
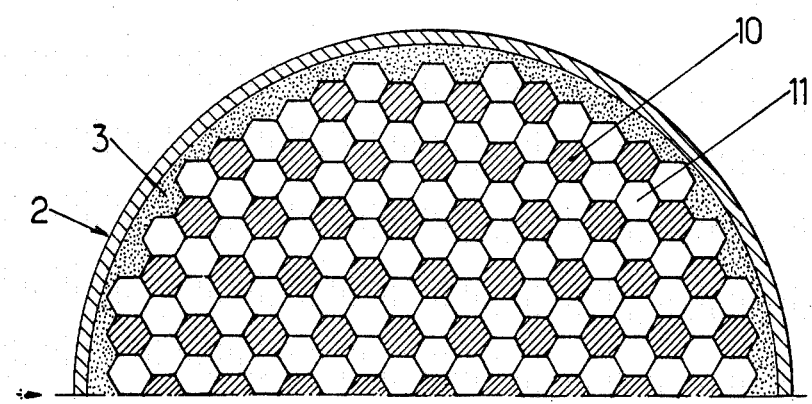
FIG. 2a is a schematic horizontal cross-section of part of the core of the same nuclear reactor as in FIG. 1a, but for operation with spectral shift up to the thermal range.

Referring to FIG. 2a, an arrangement of reactor core 9 has been shown formed from fuel assemblies which, in accordance with the present invention, are positioned in the same way as assemblies 4, 5 and 6 of the core previously described in the heavy reflector 3 fixed to the core casing 2.

Two types only of prismatic shaped assemblies with hexagonal section having the same dimension as assemblies 4, 5 and 6 are disposed inside the baffle plating.

Each of the assemblies 10 and 11 is equipped, as in the previously described case and at the same positions in the lattice of fuel elements 12 (identical to that of elements 7), with guide tubes 13 for receiving either fertile element clusters for assemblies 11 or absorbing element clusters for assemblies 10.

Introducing fertile clusters into the guide tubes 13 of assemblies 11 reduces the volume of the moderator in the core and thus allows operation of the reactor identical to that described in French Patent Application No. 81 18011 (FR-A-2,535,509) thus causing local "hardening" of the neutron spectrum.

Figure 2B:
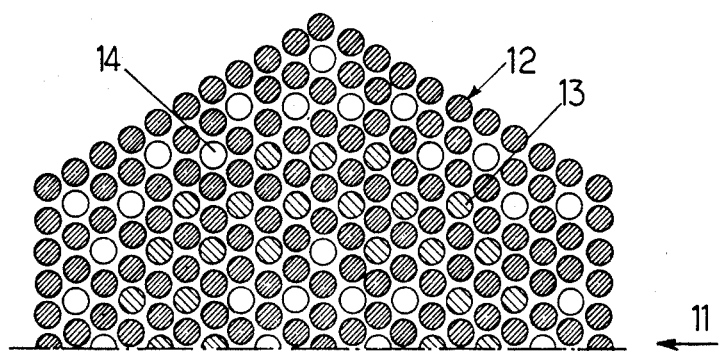

Referring to FIG. 2b, such local hardening is made necessary because assemblies 11 are for use in the spectrum of the thermal neutrons when the fertile clusters are removed from guide tubes 13.

In accordance with the present invention, so that the moderation ratio is compatible with a conventional operating mode in the spectrum of the thermal neutrons, assemblies 10 and 11 comprise, in the lattice of the fuel element network, positions 14 devoid with fissile elements 12, such positions being evenly distributed.

By thus omitting fissile elements, fuel assemblies 10 and 11 are defined, of the same dimension as assemblies 4, 5 and 6 of the preceding arrangement, but whose moderation ratio has been increased thus causing fission reaction to occur in the thermal neutrons energy spectrum.

Positions 14 devoid of fissile elements may however be provided with sheaths or tubes, identical to the sheaths of fuel elements 12, containing water so that the total amount of water in assembly 11 is identical to the amount of water in assembly 4; the two types of assemblies are consequently identical in so far as the head loss of the coolant flowing therethrough is concerned.

Sheaths full of water may similarly be provided which do not comprise closure plugs at their ends but which are in the form of open tubes allowing filling thereof with the reactor coolant.

Figure 3:
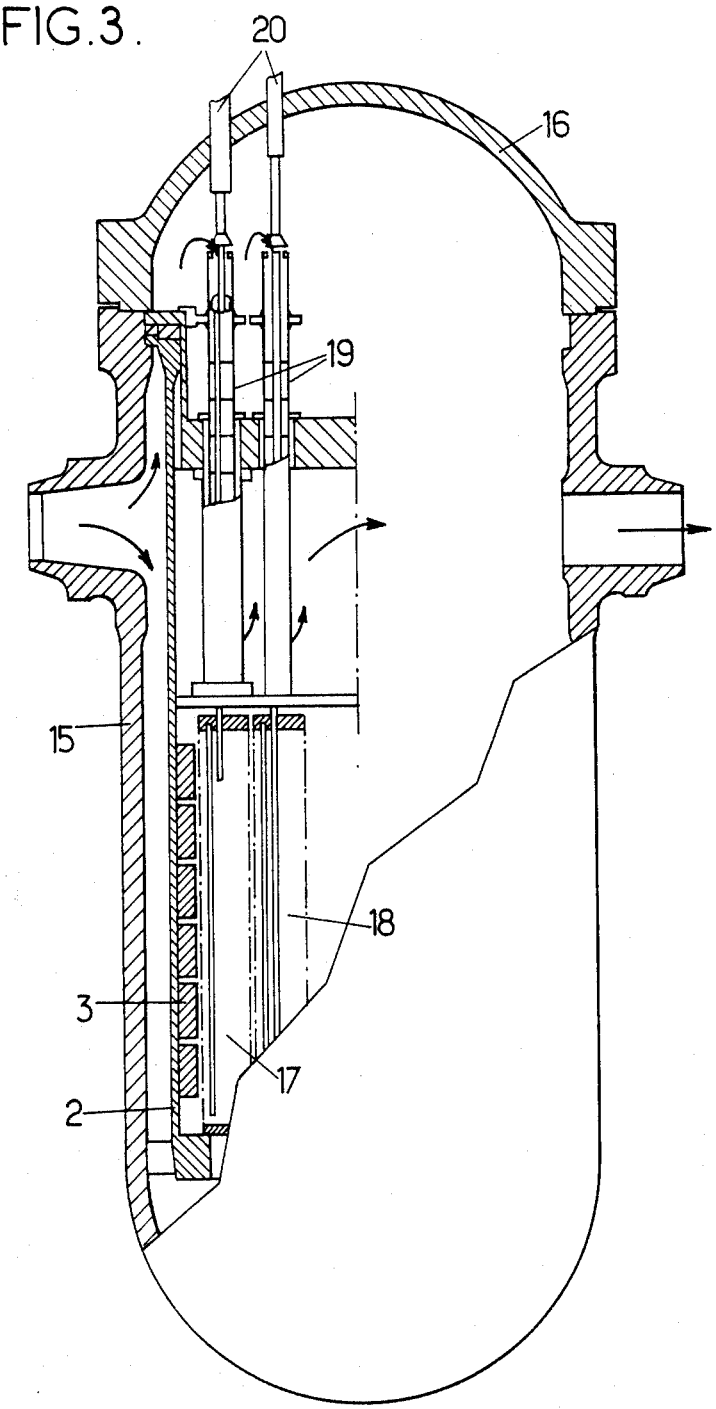
Figure 4:
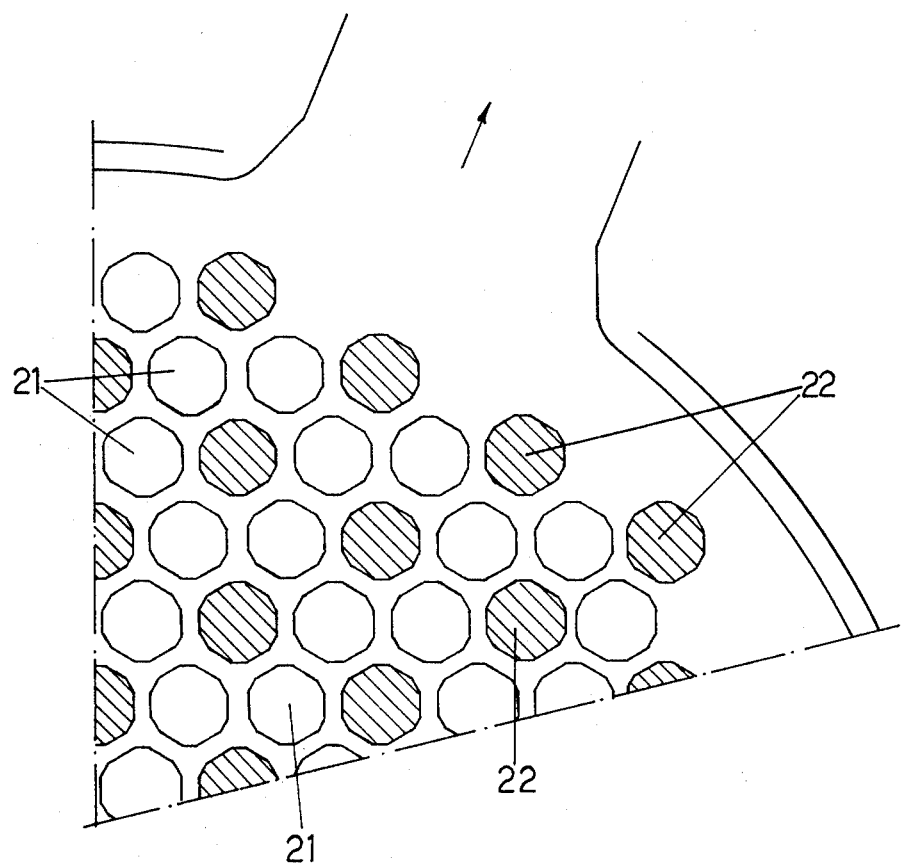
FIG. 4 is a schematic horizontal view at the level of the plenum of the reactor of FIG. 3, illustrating a possible distribution of the clusters.

Referring to FIG. 3, the invention may be applied to a reactor having a general arrangement similar to that of the conventional PWRs. A pressure vessel 15 having a cover 16 contains the core envelope 2. The heavy reflector 3 is located inside the envelope and contains the core 1 consisting of adjacent fuel assemblies. Only a fuel assembly 17 for receiving a cluster of absorbing rods and a fuel assembly 18 for receiving a cluster of fertile rods have been illustrated. The upper internals of the reactor comprise a cluster guide 19 above each fuel assembly location. An actuating mechanism 20 is located above each such location. It will not be described here, since it may be fully conventional in nature. As a rule, hydraulic actuating mechanisms will be used for fertile clusters and electromechanical actuating mechanisms for absorbing clusters Referring to FIG. 4, the fertile rod clusters 21 are about twice as numerous as the absorbing rod clusters 22 indicated by hatching).

It will be appreciated that it becomes possible to operate a same nuclear reactor according to anyone of a plurality of operating modes.

For instance, for reducing the amount of plutonium required for the first load of an under-moderated reactor, one or more operating cycles may be carried out using a conventional spectral shift core with fertile clusters for spectral shift and for local hardening of the neutron flow during part of the cyles. Thus, and as an example, the method of the present invention allows an operator to select a working sequence of a nuclear reactor in which the components forming the core are either identical or compatible as regards dimensions by effecting the following steps:

A core 9 formed from fuel assemblies 10 and 11 is loaded. After closure of the vessel lid, the fertile and absorbing clusters are fully inserted into the guide tubes 13. Then the fission reaction is initiated by extracting absorbing clusters.

During an eight month duration, the reactor then operates with a spectrum which is locally hardened. The fertile material contained in the clusters as well as in the fissile elements 12 are transformed into fissile material.

The fertile clusters are removed at the end of this time and for a period of two months the reactor operates in a thermal neutron energy spectrum using part of the fissile material produced.

After shut-down of the reactor at the end of the cycle, it is possible: either to carry out again the same cycle by replacing part of assemblies 10 and 11 by new assemblies 10 and 11 or to select a different operating mode.

Thus, either for increasing production of fissile material or for using fuel assemblies with low fissile material enrichment, or finally for economizing on the cycle of the raw material formed by the uranium, core 1 may be loaded while replacing all or part of assemblies 10 and 11 by assemblies 4, 5 and 6 allowing, after closure of the vessel and initiation of the fission reaction, operation with high conversion rate.

We claim:

1. A method of operating a light water moderated and cooled nuclear reactor having a core consisting of a plurality of adjacent fuel assemblies and having internals arranged to slidably receive only spectral shift fertile rod clusters and neutron absorption control rod clusters at predetermined locations, for movement into and out of said core, comprising the steps of:

(a) operating said reactor during at least one life cycle of the core with a core consisting of fuel assemblies of a first type, each fuel assembly of said first type having a plurality of fuel elements distributed at nodes of a regular polygonal array, some of those nodes of the array which are devoid of fuel elements being occupied by guide tubes so located as to slidably receive one of said spectral shift fertile rod clusters and said neutron absorption control rod clusters while all other nodes of the array which are devoid of fuel elements are continuously occupied during operation only by water, the number, size and spacing of said fuel elements being so selected that the core operates with thermal neutrons when said spectral shift fertile rod clusters are out of said core, operating said reactor with said fertile rod clusters in said core during an initial part of the life cycle of the core and with said fertile rod clusters withdrawn from said core after said cycle has partly elapsed, whereby a shift of the neutron energy spectrum down to the thermal range is achieved, wherein said step of operating said reactor includes operating said reactor in an arrangement wherein there is no provision for insertion of spectral shift rods or neutron absorption control rods into said nodes of the array which are continuously occupied only be water during reactor operation, and (b) operating said reactor with a conversion rate which is higher than during said at least one life cycle during a subsequent life cycle after some at least of the fuel assemblies in said core are substituted with fuel assemblies of a second type each having the same plurality of fuel elements distributed at the same nodes of the same polygonal array as in the fuel assemblies of the first type, additional fuel elements located at those nodes of the array which were continuously occupied during operation only by water in said fuel assemblies of the first type, and guide tubes occupying the same nodes as the guides tubes in said fuel assemblies of the first type, operating said reactor with spectral shift during said subsequent life cycle, wherein said step of operating said reactor includes operating said reactor in an arrangement wherein there is no provision for insertion of spectral shift rods or neutron absorption control rods into said nodes of the array which are continuously occupied only by water during reactor operation.

2. A method according to claim 1, coprising operating said reactor during said subsequent life cycle entirely in undermoderated condition.

3. A method according to claim 2, comprising operating said reactor during said one life cycle with a moderation ratio in the range of from 1.5 to 2 and operating said reactor during said subsequent life cycle with a moderation ratio in the range of 1.1 to 1.4 with fuel assemblies containing fertile material only at the periphery of the core.

4. A method according to claim 1, wherein each of said fuel assemblies is associated with a respective one of said rod clusters, the number of spectral shift fertile rod clusters being approximately twice the number of neutron absorption control rod clusters.

5. A method of operating a pressurized light water moderated and cooled nuclear reactor having a core consisting of a plurality of adjacent fuel assemblies and having internals arranged to only receive a plurality of spectral shift fertile rod clusters and a plurality of neutron absorption control rod clusters at predetermined locations, for movement into and out of said core, comprising:

(a) operating said reactor during at least one life cycle of the core with a core consisting of fuel assemblies of a first type each fuel assembly of said first type having a plurality of fuel elements distributed at nodes of a regular polygonal array, containing U235-enriched uranium, some of those nodes of the array which are devoid of fuel elements being occupied by guide tubes located to slidably receive one of said spectral shift fertile rod clusters and neutron absorption rod clusters while all other nodes of the array which are devoid of fuel elements are continuously occupied during operation only by water, the number, size and spacing of said fuel elements being so selected that said core operates with thermal neutrons when said spectral shift fertile rod clusters are out of said core, operating said reactor with said fertile rod clusters in said core during an initial part of the life cycle of the core and with said fertile rod clusters withdrawn from said core after said cycle has partly elapsed, whereby a shift of the neutron energy spectrum down to the thermal range is achieved, wherein said step of operating said reactor includes operating said reactor in an arrangement wherein there is no provision for insertion of spectral shift rods or neutron absorption control rods into said nodes of the array which are continuously occupied only by water during reactor operation, and (b) operating said reactor with a conversion rate during a subsequent life cycle which is higher than during said at least one life cycle, with a core consisting of a combination of fuel assemblies of the first type and fuel assemblies of a second type, each of said assemblies of the second type having the same plurality of fuel elements distributed at the same nodes of the same polygonal array as in the fuel assemblies of the first type, additional fuel elements located at those nodes of the array which were continuously occupied during operation only by water in said fuel assemblies of the first type, and guide tubes occupying the same nodes as the guide tubes in said fuel assemblies of the first type, operating said reactor with spectral shift during said subsequent life cycle and all fuel elements in said assemblies of the second type containing fuel material consisting of plutonium-enriched natural or depleted uranium, wherein said step of operating said reactor includes operating said reactor in an arrangement wherein there is no provision for insertion of spectral shift rods or neutron absorption control rods into said nodes of the array which are continuously occupied only by water during reactor operation.

* * * * *

UNITED STATES PATENT AND TRADEMARK OFFICE
CERTIFICATE OF CORRECTION

PATENT NO. : 4,770,840

DATED : SEPTEMBER 13, 1988

INVENTOR(S) : LEROY ET AL.

It is certified that error appears in the above-identified patent and that said Letters Patent is hereby corrected as shown below:

Title page, after item [22] insert the following:

--[30] Foreign Application Priority Data
    May 30, 1984...[FR]...France...........84  08548--.

Signed and Sealed this

Twenty-sixth Day of December, 1989

Attest:

JEFFREY M. SAMUELS

Attesting Officer     Acting Commissioner of Patents and Trademarks